W. D. & W. J. Armstrong
Gate
No. 63,687. Patented Apr. 9, 1867.

Witnesses.
Theo Tusche
J. A. Servie

Inventors.
W. D. Armstrong
W. J. Armstrong
Per Munn & Co.
Attorneys

United States Patent Office.

W. D. ARMSTRONG AND W. I. ARMSTRONG, OF HARLEM, ILLINOIS.

Letters Patent No. 63,687, dated April 9, 1867.

---

IMPROVEMENT IN GATES.

---

The Schedule referred to in these Letters Patent and making part of the same.

---

TO ALL WHOM IT MAY CONCERN:

Be it known that we, W. D. ARMSTRONG and W. I. ARMSTRONG, of Harlem, in the county of Winnebago, and State of Illinois, have invented a new and useful Improvement in Gates; and we do hereby declare that the following is a full, clear, and exact description thereof, which will enable others skilled in the art to make and use the same, reference being had to the accompanying drawings, forming part of this specification, in which—

Similar letters of reference indicate like parts.

Our invention has for its object to improve the construction of the gate invented by W. I. ARMSTRONG, patented August 21, 1866, and numbered 57,432; and it consists in the combination of an eccentric pulley or wheel with one of the central posts, and with the cord or chain of the heavy or balance weight; in pivoting the lower ends of the side levers to the middle posts by a bolt passing through the ends of the said levers, and through the said posts; in attaching a spring catch to the forward end of the gate, and operating it by the cords or chains by which the gate is raised; in the combination of guards with the sides of the gate and with the side levers; and in the combination of long pulleys or friction-rollers with the middle posts and with the operating cords or chains, the whole being constructed and arranged as hereinafter more fully described.

Figure 1:
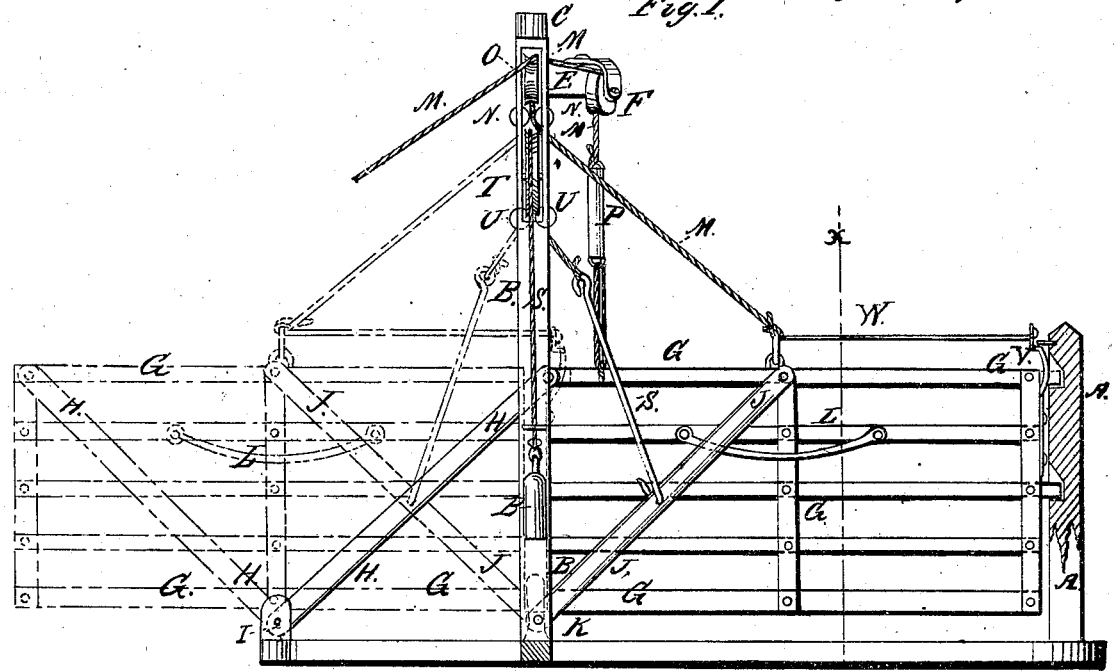
Figure 1 is a side view of our improved gate, partly in section, through the line $y\,y$, fig. 2.
Figure 2:
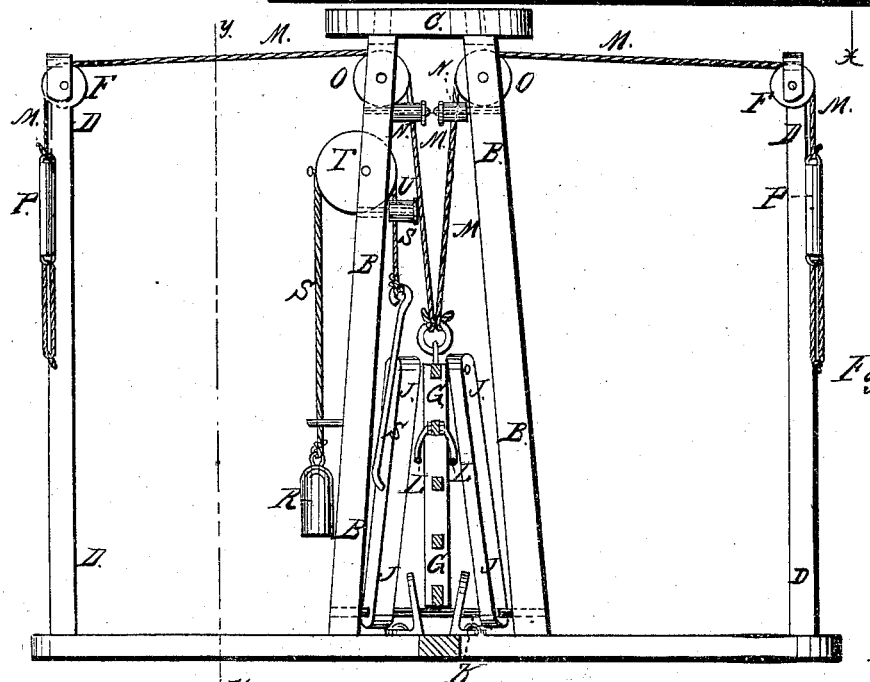
Figure 2 is a vertical section of the same, taken through the line $x\,x$, fig. 1.

A is the front gate-post, in the front side of which are formed mortises, having bevelled sides and tops to receive the projecting ends of the horizontal bars of the gate. B are the central posts, the upper ends of which are connected and held in their proper relative positions by the cross-bar C, as shown in fig. 2. D are the outer posts, to the upper ends of which are attached arms E, to the ends of which are pivoted the pulleys F, as shown in figs. 1 and 2. G is the gate, to the rear upper corner of which are pivoted the upper ends of the levers H, the lower ends of which are pivoted to suitable supports set in the ground by a long bolt, I, passing through the said supports and through the lower ends of the said levers. This bolt I also forms a rest or support for the gate when fully open, as shown in red in fig. 1. J are the side levers, the upper ends of which are pivoted to the middle of the upper part of the gate, and the lower ends of which are pivoted to the central posts B by a long bolt, K, passing through the said posts, and through the lower ends of the said levers, as shown in fig. 2. The bolt K also forms a support for the rear end of the gate when closed, and for its forward end when opened, as shown in fig. 1. L are guards, attached to the sides of the middle part of the gate, which, by coming in contact with the side levers J, keep the said gate in proper position while being opened and closed. M are the cords or chains by which the gate is operated. The forward ends of the cords M are attached to the upper edge of the gate at its middle part; thence they pass back to the upper part of posts B, where they pass between the long pulleys or friction-rollers N, and over the pulleys O; thence they pass out to the upper ends of the posts D, where they pass over the pulleys F, as shown in figs. 1 and 2. P are weights, attached to the free ends of the cords M, and which should be of sufficient size to keep the said cords or chains always taut. To the lower ends of the weights P may be attached handles or loops for convenience in operating the gate. R is the heavy or balance weight, which is attached to the end of the cord or chain S. The cord or chain S passes over the eccentric-pulley or wheel T, between the long pulleys or friction-rollers U, and its other end is attached to the side lever J, as shown in figs. 1 and 2. If desired, the end of the cord or chain S, that is attached to the lever J, may be replaced by a rod or bar, as being less liable to get foul in operating the gate. The cord or chain S should be so attached to the lever J that opening the gate half way will revolve the pulley T half around; and, when the gate is shut, the pulley T should stand with its shortest radius towards the gate. To keep the pulley T from getting out of this relative position as it moves back and forth in operating the gate the cord or chain S may be fastened to its face by a staple, or in some other convenient manner. By this construction and arrangement of the eccentric-pulley T and cord or chain S the gate will be more nearly balanced in all positions by the weight R, the weight acting upon the longest radius of the pulley, and the gate upon the shortest one, at the time that the gate bears down upon the chain or cord S with the greatest force. Hence, it is obvious that, by the use of the eccentric-pulley, as above described, the gate can be opened and shut by a much less power. V is a spring catch attached to the gate G to fasten it shut, and which is connected to the cords or chains M by a rod, W, so that, upon pulling upon either of the said cords or chains to open the gate, the first effect is to draw back the spring catch V, and unfasten the gate.

What we claim as new, and desire to secure by Letters Patent, is—

1. The combination of the eccentric-pulley or wheel T with one of the central posts B, and with the cord or chain S of the heavy or balance weight R, substantially as herein shown and described, and for the purpose set forth.

2. Pivoting the lower ends of the side levers J to the central posts B by a long bolt, K, substantially as herein shown and described, and for the purpose set forth.

3. Attaching a spring catch V to the forward end of the gate, and operating it by the cords or chains M by which the gate is operated, substantially as herein shown and described.

4. The combination of the guards L with the sides of the gate G, and with the side levers J, substantially as herein shown and described, and for the purpose set forth.

5. The combination of the long pulleys or friction-rollers N and U with the central posts B, and with the cords or chains M and S, substantially as herein shown and described, and for the purpose set forth.

W. D. ARMSTRONG,
W. I. ARMSTRONG.

Witnesses:
    AMOS WARD,
    THOMAS J. RUDD.